United States Patent [19]

Robinson

[11] 4,374,970

[45] Feb. 22, 1983

[54] SULFUR-MODIFIED COPOLYETHER GLYCOLS, A METHOD FOR PREPARING THEM, AND POLYURETHANES PREPARED THEREFROM

[75] Inventor: Ivan M. Robinson, Wilmington, Del.

[73] Assignee: E. I. Du Pont de Nemours and Company, Wilmington, Del.

[21] Appl. No.: 281,202

[22] Filed: Jul. 7, 1981

[51] Int. Cl.$^3$ .......................... C08G 18/52; C09K 3/00
[52] U.S. Cl. ..................................... 528/79; 521/174;
521/177; 521/914; 252/182; 528/76; 568/46;
568/47; 568/580; 568/581; 568/617
[58] Field of Search ...................... 568/46, 47; 528/76,
528/79; 521/174, 177, 914; 252/182

[56] References Cited

U.S. PATENT DOCUMENTS

| | | | |
|---|---|---|---|
| 2,582,605 | 1/1952 | Richter et al. | 260/608 |
| 2,900,368 | 8/1979 | Stilmar | 260/77.5 |
| 2,998,413 | 8/1961 | Holtschmidt et al. | 568/46 |
| 3,005,803 | 10/1961 | Holtschmidt et al. | 568/46 |
| 3,425,999 | 2/1969 | Axelrood et al. | 521/914 |
| 4,127,513 | 11/1978 | Bellis | 528/413 |

FOREIGN PATENT DOCUMENTS 854958 11/1960 United Kingdom .

*Primary Examiner*—H. S. Cockeram

[57] ABSTRACT

Copolyether glycols are modified so that they contain 1-25%, by weight of $\beta,\beta'$-dihydroxyalkyl sulfide moieties.

These modified copolyether glycols have enhanced resistance to degradation by heat and oxygen.

The invention also relates to a method of making the modified copolyether glycols, to their use as stabilizers against the degradation of the polyether chains, and to polyurethanes made with them.

12 Claims, No Drawings

SULFUR-MODIFIED COPOLYETHER GLYCOLS, A METHOD FOR PREPARING THEM, AND POLYURETHANES PREPARED THEREFROM

DESCRIPTION

Technical Field

This invention relates to copolyether glycols which have been modified so that they contain sulfur-containing moieties in their polymer chains. It is more particularly directed to such copolyether glycols modified to contain dehydrated $\beta,\beta'$-dihydroxyalkyl sulfide (HAS) moieties in their chains.

The invention also relates to a method of making the modified copolyether glycols, to their use as stabilizers against the degradation of the polyether chains, and to polyurethanes made with them.

Background and Summary of the Invention

Polyurethanes have been known and used for many years, and the basic general chemistry for their preparation, the reaction of a polyol, a polyisocyanate and a chain extender, is fully documented.

A polyol which has been used for this purpose is the copolyether glycol (CPG) based on tetrahydrofuran (THF) and an alkylene oxide (AO), which is well known to be degraded by exposure to oxygen, light and heat. It has been the general practice to guard against this degradation by blending with the CPG an external stabilizer such as a phenolic, an amine or a sulfur compound.

It has now been found, according to the invention, that the stabilization can be more effectively and efficiently achieved if the CPG is modified so that it contains in its chain 1-25%, by weight, preferably 3-15%, even more preferably 4-10%, of moieties represented by the structure

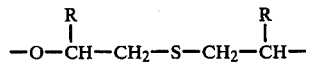

where R is hydrogen, an alkyl radical of 1–3 carbon atoms or phenyl, and the oxygen atom is linked to a hydrogen atom or a carbon atom.

Preferably the modified CPG has an oxygen/sulfur atom ratio of 3/1 or greater, even more preferably 5–60/1.

It has been found, according to the invention, that the stabilization against degradation can also be achieved if the unmodified CPG to be used is physically blended with about 0.4–20%, by weight, of the modified CPG.

In addition, the method for preparing the modified CPG of the invention can be used to increase the molecular weight of the CPG by coupling polymer chain segments with HAS moieties.

It has also been found that a CPG modified according to the invention shows significantly better resistance to acid-catalyzed depolymerization and to oxidative degradation at high temperatures than an unmodified CPG.

DETAILED DESCRIPTION OF THE INVENTION

The modified CPG of the invention is made by catalytically reacting a suitable CPG with an HAS.

The CPG starting material is one based on THF and an AO, and is sometimes also referred to as a copolymer of THF and an AO.

"AO", as used herein, means an alkylene oxide whose ring contains two or three carbon atoms. The AO can be unsubstituted or substituted with, for example, alkyl groups or halogen atoms. Illustrative alkylene oxides are ethylene oxide (EO), 1,2-propylene oxide (PO), 1,3-propylene oxide, 1,2-butylene oxide, 1,3-butylene oxide, 2,2'-bis-chloromethyl-1,3-propylene oxide and epichlorohydrin. The copolyether glycols preferred for use are those of THF and EO and THF and PO. The CPG can also be of THF and two or more alkylene oxides, as for example a THF/EO/PO polymer.

The CPG will have
(1) 10–80%, by weight, of AO units, preferably 20–60%, even more preferably 30–55%; and
(2) hydroxyl functionalities of 2.0–4.0, preferably 2.0–2.5.

The CPG starting material can be of any practical molecular weight, but will preferably have a number average molecular weight of 500–4000, even more preferably 800–3000.

Number average molecular weight is determined by first determining the hydroxyl number of the sample by titrating it with acetic anhydride according to ASTM-D-1638 and then converting this number to number average molecular weight according to the formula $$\text{Molecular weight} = \frac{56{,}000 \times n}{\text{hydroxyl number}}$$

where n is the hydroxyl functionality of the sample.

The CPG can be produced by any of the known methods. Illustrative of such methods are those shown in British Pat. No. 854,958 and U.S. Pat. No. 4,127,513. The disclosures of those documents are incorporated into this application to show how such copolymers are prepared.

The HAS used is represented by the structure

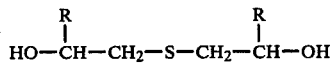

where R is hydrogen, an alkyl radical of 1–3 carbon atoms or phenyl.

The HAS preferred for use is $\beta,\beta'$-dihydroxyethyl sulfide.

Any such HAS not available in the marketplace can be made by the well-known reaction of hydrogen sulfide and an alkylene oxide.

The preparative reaction is conducted in a mixture of CPG and HAS. The relative amounts of HAS and CPG used are dictated by the weight of HAS moieties desired in the product. These amounts can be easily calculated using the principles of stoichiometry. In general, one uses 0.5–6 moles of HAS for each mole of CPG, preferably 1–2 moles.

The catalyst used can be any heterogeneous or homogeneous acid catalyst stronger than $H_3PO_4$. It is preferably an alkyl- or aryl sulfonic acid, even more preferably one of the strongly acidic cationic ion-exchange resins bearing —$SO_3H$ groups, insoluble in the reaction medium. "Insoluble" means that the amount of resin which dissolves in the medium under reaction conditions will give the modified CPG product an acid number of no greater than 0.05 mg of KOH per gram. The nature of the "backbone" of the resin is unimportant. The most common of the commercially available resins of this type have backbones which are of the polystyrene type, but resins having other backbones can be used.

Preferred among the polystyrene type resins, and preferred for this use according to the invention, is one sold by the Rohm & Haas Company of Philadelphia, PA as Amberlyst® XN-1010. This macroreticular resin has a cation exchange capacity of 3.1 milliequivalents per gram, a surface area of 450 square meters per gram, a porosity of 41%, and a mean pore diameter of 0.005 micron.

The catalyst is used at a concentration of 0.1–10%, by weight of the CPG, preferably 2–5%.

The preparation is begun by placing the reactants and catalyst in a vessel and bringing the resulting mixture to a temperature of 130°–170° C., preferably about 150° C., and holding it at that temperature, with stirring, until the HAS has been consumed, as shown by periodic sampling and analysis by gas chromatography.

The water formed by the reaction can be removed from the reaction mass by vacuum distillation or by sweeping the reaction zone with an inert gas such as nitrogen. Preferably, the water is removed as a water/hydrocarbon azeotrope, even more preferably as a water/toluene azeotrope. The hydrocarbon can then be separated from the azeotrope by condensation in a suitable trap and can be recycled to the reaction mass. When this procedure is used, the temperature of the reaction mass can easily be held within the desired range by adjusting the concentration of toluene.

When the CPG-HAS reaction is finished, heating is stopped and the catalyst is removed from the reaction mass, by precipitation with calcium hydroxide in the case of a homogeneous catalyst, or by filtration in the case of a heterogeneous catalyst. The remaining material is then stripped of residual volatiles.

The resulting product is a viscous liquid having a number average molecular weight of 500–10,000, preferably 800–5000, and an oxygen/sulfur atom ratio of 3/1 or greater, preferably about 5–60/1. Molecular weight can be varied by simply allowing the reaction to proceed until the desired molecular weight is reached.

The blends of unmodified CPG and CPG modified according to the invention can be made by simply mixing them in amounts which will give a mixture containing 0.4–20%, by weight, of the modified CPG.

A polyurethane can be prepared from a modified CPG of the invention, or from a modified-unmodified blend, by reacting it with an organic polyisocyanate and an aliphatic polyol or polyamine chain extender, as is well known in the art.

The polyisocyanates used in preparing the polyurethanes can be any of the aliphatic or aromatic polyisocyanates ordinarily used to prepare polyurethanes. "Polyisocyanate" means any compound having two or more —NCO radicals. Illustrative are 2,4-toluene diisocyanate
2,6-toluene diisocyanate
hexamethylene-1,6-diisocyanate
tetramethylene-1,4-diisocyanate
cyclohexane-1,4-diisocyanate
naphthalene-1,5-diisocyanate
diphenylmethane-4,4'-diisocyanate
xylylene diisocyanate
hexahydro xylylene diisocyanate
dicyclohexylmethane-4,4'-diisocyanate
1,4-benzene diisocyanate
3,3'-dimethoxy-4,4'-diphenyl diisocyanate
m-phenylene diisocyanate
isophorone diisocyanate
polymethylene polyphenyl isocyanate
4,4'-biphenylene diisocyanate
4-isocyanatocyclohexyl-4'-isocyanatophenyl methane
p-isocyanatomethyl phenyl isocyanate.

Mixtures of isocyanates can also be used.

The isocyanates preferred for use because of the desirable properties they confer on the polyurethane products are diphenylmethane-4,4'-diisocyanate and the toluene diisocyanates.

The chain extenders used in preparing the polyurethanes can be any of the aliphatic polyols, or any of the aliphatic or aromatic polyamines ordinarily used to prepare polyurethanes.

Illustrative of the aliphatic polyols which can be used as chain extenders are 1,4-butanediol
ethylene glycol
1,6-hexanediol
glycerine
trimethylolpropane
pentaerythritol
1,4-cyclohexane dimethanol
phenyl diethanolamine.

Diols like hydroquinone bis($\beta$-hydroxyethyl)ether, tetrachlorohydroquinone-1,4-bis($\beta$-hydroxyethyl)ether and tetrachlorohydroquinone-1,4-bis($\beta$-hydroxyethyl)sulfide, even though they contain aromatic rings, are considered to be aliphatic polyols for purposes of the invention.

Aliphatic diols of 2–10 carbon atoms are preferred. Especially preferred is 1,4-butanediol. Mixtures of diols can also be used.

Illustrative of the polyamines which can be used as chain extenders are p,p'-methylene dianiline and complexes thereof with alkali metal chlorides, bromides, iodides, nitrites and nitrates.
4,4'-methylene bis(2-chloroaniline)
dichlorobenzidine
piperazine
2-methylpiperazine
oxydianiline
hydrazine
ethylenediamine
hexamethylenediamine
xylylenediamine
bis(p-aminocyclohexyl)methane
dimethyl ester of 4,4'-methylenedianthranilic acid
p-phenylenediamine
m-phenylenediamine
4,4'-methylene bis(2-methoxyaniline)
4,4'-methylene bis(N-methylaniline)
2,4-toluenediamine
2,6-toluenediamine
benzidine
3,4'-dimethylbenzidine
3,3'-dimethoxybenzidine
dianisidine
1,3-propanediol bis(p-aminobenzoate)
isophorone diamine
1,2-bis(2'-aminophenylthio)ethane.

The amines preferred for use are 4,4'-methylene bis(2-chloroaniline), 1,3-propanediol bis(p-aminobenzoate) and p,p'-methylenedianiline and complexes thereof with alkali metal chlorides, bromides, iodides, nitrites and nitrates. Mixtures of amines can also be used.

The polyurethanes can be prepared in two steps, the first of which is conducted under nitrogen at ambient pressure to prevent oxidation of the reactants and product, and to prevent exposure of the reaction mass to atmospheric moisture. In the first step, the modified CPG-starting material is dried by heating it at a temperature of 80°–100° C. under vacuum, and is then held at 60°–125° C., preferably about 70°–90° C., while a stoichiometric excess, preferably twofold to tenfold, of organic polyisocyanate is added, with stirring. The actual amount of isocyanate used depends on the molecular weight of the modified CPG used, as is well known in the art. The reaction mass is held for about 1–4 hours at 60°–125° C., with stirring, and the free isocyanate content of the mass is then determined by titrating it with di-n-butylamine, as described in Analytic Chemistry of the Polyurethanes, Volume XVI, Part III, D. J. David and H. B. Staley, Wiley-Interscience, 1969, pages 357–359.

In the second step, an amount of polyamine or polyol chain extender calculated to give an isocyanate/hydroxyl or amine mole ratio of about 0.1–1.1 to 1 in the reaction mass, preferably 1–1.05 to 1, is degassed at about 30°–120° C. and 1330–5330 Pa (10–50 mm Hg) pressure and quickly added to the reaction mass.

A conventional curing catalyst can be added at this point if desired. Illustrative of catalysts which can be used are dibutyltin dilaurate and stannous octoate. The catalyst can be added to the reaction mass to give a concentration of about 0.001–0.1%, by weight, preferably about 0.01%.

The reaction mass is held with stirring at 60°–130° C. until it is homogeneous, which normally takes 1–5 minutes. The mass is then poured into molds, preferably preheated to 100°–120° C., and then cured at about 100°–120° C. at a pressure of 1700–2500 kPa for from 5 minutes to several hours. The casting is then cooled, removed from the mold, aged for about one week at ambient temperature, and is then ready for use.

The polyurethanes can also be made by reaction-injection and liquid-injection molding techniques, whereby the starting materials are simultaneously injected and mixed in a mold, preferably together with a conventional polyurethane catalyst and then subjected to pressures ranging from ambient to several million pascals and temperatures ranging from ambient to 150° C. Use of a foaming agent such as a fluorocarbon or water is optional.

BEST MODE

In the following example, all parts are by weight.
The following were added to a reaction vessel fitted with a reflux condenser and a Dean Stark trap:

| | |
|---|---|
| Copolyether glycol of THF and EO 63/37 $\overline{M}_n$ - 1000 | 100 parts |
| β,β'-dihydroxyethyl sulfide | 12.2 parts |
| Toluene | 50 parts |

-continued

| | |
|---|---|
| Amberlyst ® XN-1010 | 4.0 parts |

The resulting mixture was heated to and held at reflux temperature for nineteen hours, with stirring, while water was continuously removed from the reaction zone as the water/toluene azeotrope.

The reaction mixture was then filtered to remove the Amberlyst ® and the volatiles were removed at a pressure of about 667 Pa (5 mm of Hg) and a temperature of 150° C., to give a viscous liquid product containing 5.6% of —O—CH$_2$CH$_2$—S—CH$_2$CH$_2$— moieties, with a number average molecular weight of 3611 and an oxygen sulfur atom ratio of 31/1.

What is claimed is:

1. A copolyether glycol modified so that it contains in its chain 1–25%, by weight, of moieties represented by the structure

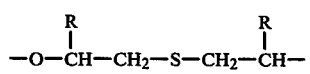

where R is hydrogen, an alkyl radical of 1–3 carbon atoms or phenyl, and the oxygen atom is linked to a hydrogen atom or a carbon atom.

2. The modified copolyether glycol of claim 1 having an oxygen/sulfur atom ratio of 3/1 or greater.

3. The modified copolyether glycol of claim 1 which is derived from a copolymer of tetrahydrofuran and ethylene oxide or a propylene oxide.

4. The modified copolyether glycol of claims 1, 2 or 3 in which the moieties are represented by the structure

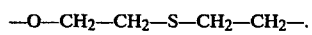

5. The modified copolyether glycol of claims 1, 2, 3 or 4 which has a number average molecular weight of 500–10,000.

6. A mixture of unmodified copolyether glycol and 0.4–20%, by weight of the mixture, of the copolyether glycol of claim 1.

7. A mixture of unmodified copolyether glycol and 0.4–20%, by weight of the mixture, of the copolyether glycol of claim 2.

8. A mixture of unmodified copolyether glycol and 0.4–20%, by weight of the mixture, of the copolyether glycol of claim 3.

9. A mixture of unmodified copolyether glycol and 0.4–20%, by weight of the mixture, of the copolyether glycol of claim 4.

10. A mixture of unmodified copolyether glycol and 0.4–20%, by weight of the mixture, of the copolyether glycol of claim 5.

11. A polyurethane which is the reaction product of
(a) the modified copolyether glycol of claim 1, 2, 3, 4 or 5;
(b) an organic polyisocyanate; and
(c) a chain extender.

12. A polyurethane which is the reaction product of
(a) the mixture of claim 6, 7, 8, 9 or 10;
(b) an organic polyisocyanate; and
(c) a chain extender.

* * * * *